March 27, 1928.  1,663,948
P. C. LAPORTE
WINTER TRACTION EQUIPMENT FOR MOTOR VEHICLES
Filed Feb. 4, 1926  3 Sheets-Sheet 3
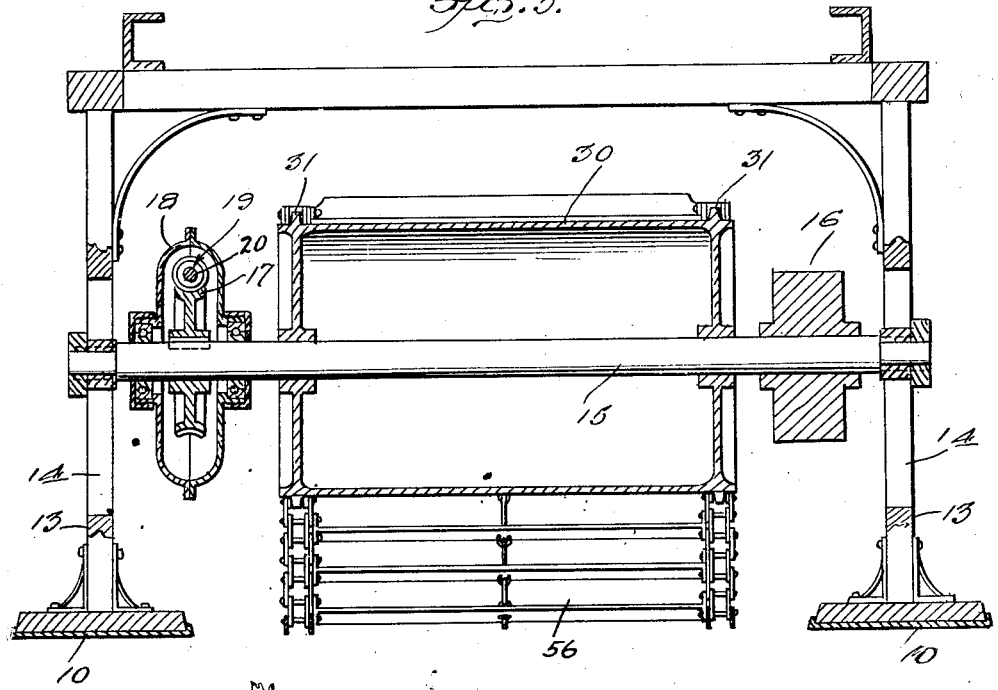
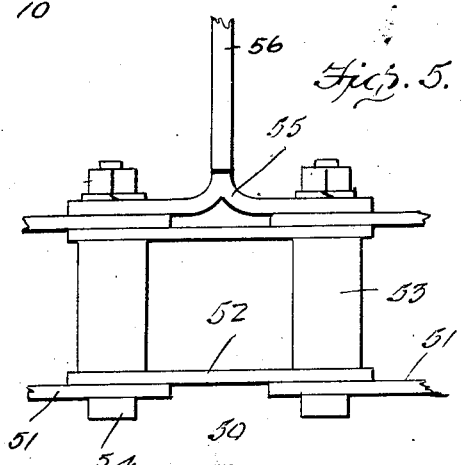
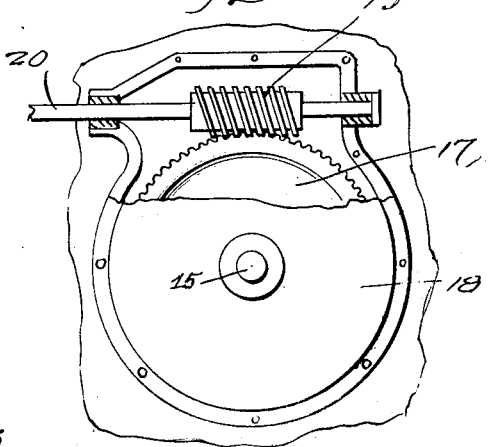
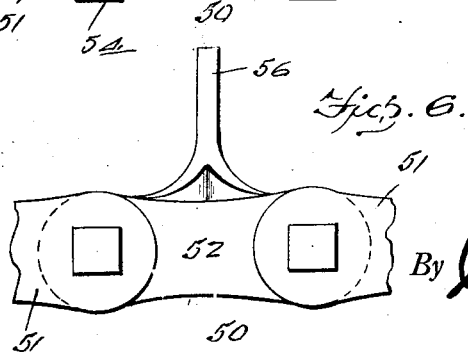
Inventor
P. C. Laporte
By Clarence A. O'Brien
Attorney Patented Mar. 27, 1928.

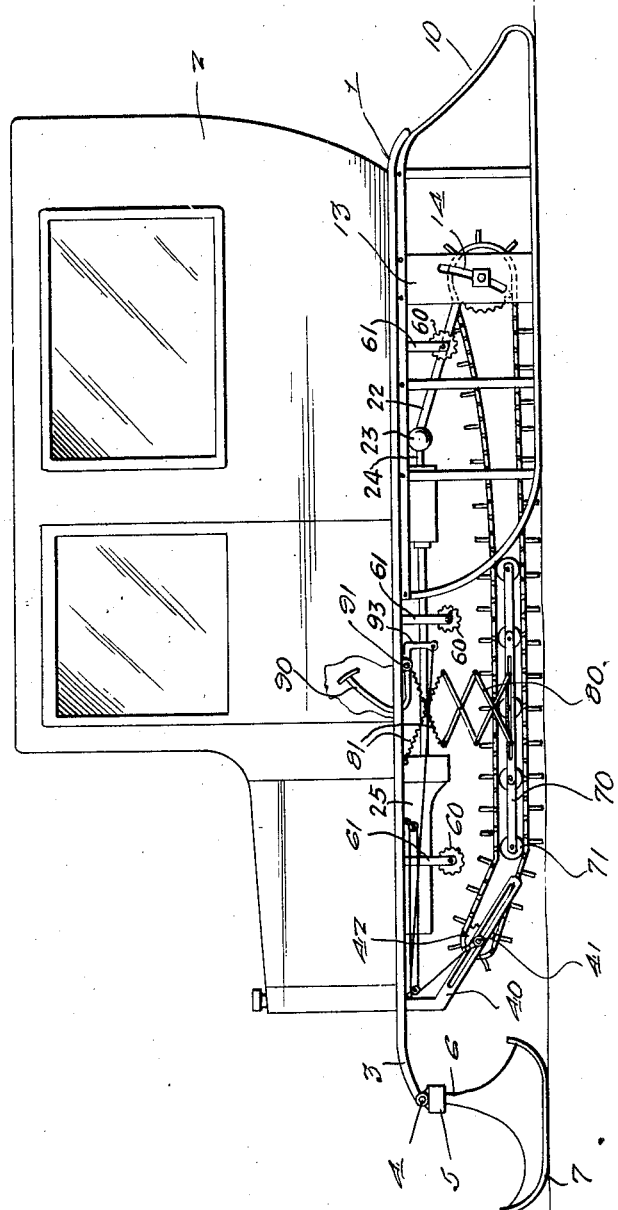

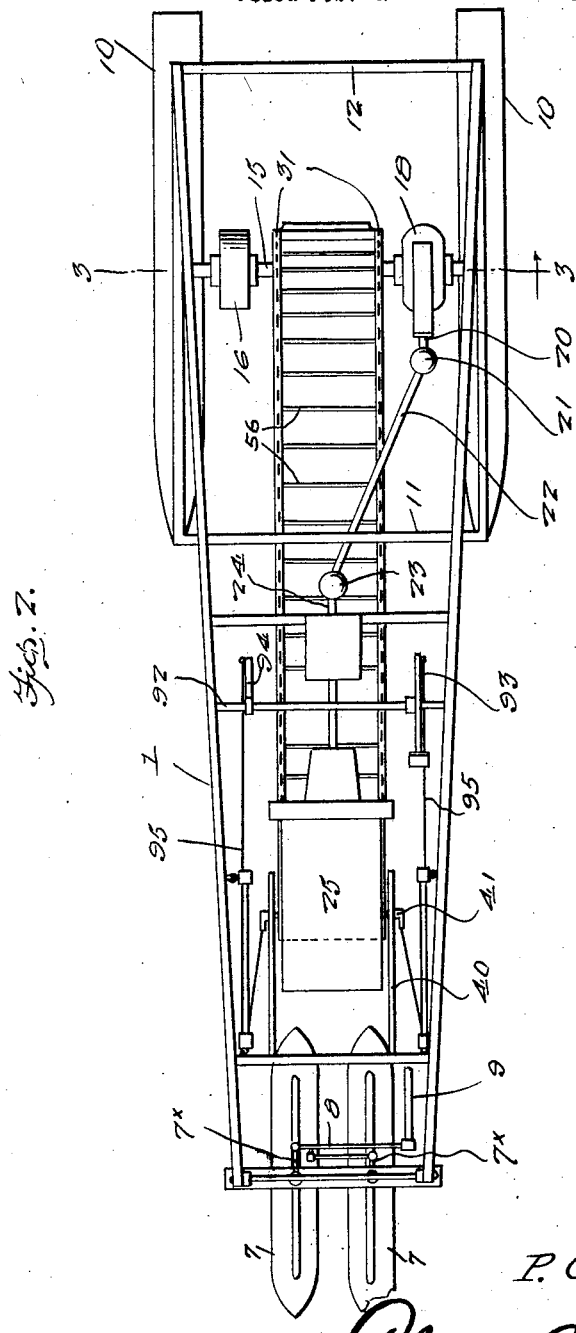

1,663,948

UNITED STATES PATENT OFFICE.

PAUL C. LAPORTE, OF CLAIR, NEW BRUNSWICK, CANADA.

WINTER TRACTION EQUIPMENT FOR MOTOR VEHICLES.

Application filed February 4, 1926. Serial No. 85,979.

My present invention pertains to motor vehicles, and has for its general object the provision of an efficient equipment whereby the motive power of the motor vehicle may be utilized to propel the same over snow covered and ice covered roads and other surfaces.

With the foregoing in mind, the invention in all of its details will be fully understood from the following description and claims when the same are read in connection with the drawings, accompanying and forming part of this specification, in which:—

Figure 1 is a side elevation showing an automobile chassis and body equipped with the preferred embodiment of my invention.

Figure 2 is a plan view of the same with the body removed.

Figure 3 is an enlarged transverse section taken in the plane indicated by the line 3—3 of Figure 2.

Figure 4 is an enlarged detail view showing the portion of the driving connection adjacent to the rear axle or drive shaft of the improvement.

Figure 5 is a fragmentary plan view on an enlarged scale showing a portion of one of the chains and also showing a portion of one of the transverse traction bars and bringing out the arrangement of said traction bar to the chain.

Figure 6 is a fragmentary side elevation or view taken at right angles to Figure 5 and showing the same parts as in Figure 5.

Similar numerals of reference designate corresponding parts in all of the views of the drawings.

The chassis of the motor vehicle is designated by 1, and the body 2 on the chassis is connected with the chassis in the conventional manner or in any other manner compatible with the purpose of my invention.

Mounted in the forwardly extending portion 3 of the chassis 1 is a transverse rock shaft 4 from which is hung a transverse swingable cross-head or bar 5. Journaled in the cross-head or bar 5 and adapted to be turned about their axes are stems 6 on longitudinally disposed runners 7, each of the said stems 6 having rearwardly directed crank arms 7× with which is connected the transversely movable connecting means 8 on a steering shaft 9, the latter being preferably of the general type ordinarily used in motor vehicles. Manifestly turning of the shaft 9 about its axis through the medium of a hand wheel or other appropriate means, will be attended by swinging of the runners 7 for the proper guidance of the motor vehicle when in motion.

Arranged under and appropriately connected with the rear portion of the chassis 1 are rear runners 10 in parallelism, the said runners 10 being fixedly connected with respect to each other through the medium of forward and rear transverse bars designated by 11 and 12, respectively. The runners 10 are of open structure, and interposed between and fixed to the lower and upper longitudinal portions of the runners are upright struts or plates 13 in which are arcuate slots 14. These slots 14 are for the reception and adjustment of the end portion of the rear drive shaft 15 of my improvement, the said drive shaft 15 being equipped at one side of the longitudinal center of the structure with a balance wheel 16 and at the opposite side of the structure with a worm gear 17, Figure 4. The said worm gear 17 is disposed in a housing 18 and is meshed with a worm 19 also disposed in said housing and carried by a longitudinally disposed shaft 20. The shaft 20 is connected through the medium of an universal joint 21 with the rear end of an intermediate shaft 22, and the forward end of the said intermediate shaft 22 is connected through an universal joint 23 with the rear end of the drive shaft 24 connected in appropriate manner with the motor vehicle engine designated by 25, and which latter may be and preferably is or conventional type. By virtue of the disposition described of the driving connection between the engine shaft and the drive shaft 15, it will be manifest that accommodation is made for the play of the traction means of my improvement which means is located in the longitudinal center of the structure and so as to work in a longitudinal plane between the planes of the runners 10.

Fixed on the drive shaft 15 is a sprocket drum 30 with peripheral teeth 31 adjacent to its ends. The said drum 30 is fixed to and derives motion from the shaft 15.

Connected with and extending downwardly and rearwardly from the forward portion of the chassis 1 are slotted hangers 40, and appropriately arranged in the slots of said hangers for adjustment purposes is a forward transverse shaft 41 on which are idler sprocket gears 42. Passed about the before mentioned sprocket teeth 31 of the drum 30 and also about the idler sprocket gears 42 are the endless parallel chains 50 of the traction means comprised in my improvement. The said chains are respectively made up of links 51 and 52, Figures 5 and 6 and the links 51 and 52 are lapped and maintained in spaced relation by spacing means 53 and are pivotally connected through the medium of transverse bolts 54. The said bolts 54 also serve for the connection of T-heads 55 at the ends of transverse traction bars 56, the said T-heads 55 being opposed to the inner portions of adjacent links 51 as clearly appears in Figures 5 and 6, whereby the traction bars 56 are maintained at right angles to the line of traverse of the chain stretches so as to lend increased efficiency to the drive belt of the improvement. It will be readily understood from Figures 2 and 3 that the traction bars 56 connect the two chains, and that the said traction bars 56 and chains move together.

At 60 on opposite sides of the improvement are idler wheels which are mounted in hangers 61 depending from the side portions of the chassis and are adapted to prevent undue upward movement of the chains of the driving belt.

Arranged longitudinally between the upper and lower stretches of the chains at opposite sides of the driving belt of the improvement are bars 70 by which are carried antifriction rollers 71 in engagement with the upper and lower stretches of the chain. The said bars 70 are connected to the lower members of lazy tongs 80, and the upper ends of the upper members of the said lazy tongs are connected to the lower ends of retractile springs 81, the said springs 81 being crossed as clearly shown in Figure 1 and having their upper ends connected to the side portions of the chassis 1. By virtue of this provision it will be manifest that the bars 70 will be yieldingly pressed downwardly with a view to holding the lower stretches of the endless chains to their work and thereby increase the traction capacity of the bars 56 on the traction belt; also, that when the said bars 70 are relieved of pressure, the transverse bars 56 of the endless belt will glide idly over the snow or icy surface.

In order to enable the driver of the motor vehicle to relieve the pressure on the lower stretches of the endless chains, I provide a pedal lever 90 fulcrumed at 91 on the chassis and fixed with respect to a transverse shaft 92 on which are arms 93 and 94, Figure 2, the said arms 93 and 94 being connected to appropriately guide cables 95 which, in turn, are connected to the forward transverse shaft 41 of the traction means, whereby depression or forward and downward movement of the pedal lever 90 will be attended by upward and forward movement of the said transverse shaft in the hangers 40, and this against the action of the means for holding the lower stretches of the endless chains to their work, namely, the lazytongs and the retractile springs 81. Manifestly when the lever 90 is released it will tend to return to the position shown in Figure 1, and incident to the said movement of the lever 90, the retractile springs 81 in conjunction with the lazytongs will press the lower stretches of the endless chains downwardly so as to hold the said endless chains or rather the lower stretches thereof in parallelism and in contact with the surface or road being traversed by the motor vehicle, so that the traction belt will operate to the best advantage in the propulsion of the vehicle.

It will be gathered from the foregoing that my improvement as a whole is simple, compact and efficient, and that it is readily applicable to a motor vehicle chassis and body as hereinbefore described. It will also be manifest that my improvement is well adapted in all respects to withstand the rough usage to which automobile appurtenances are ordinarily subjected, and that the improvement as a whole may be and preferably is detached from the chassis and disassociated from the body when it is desired to convert the vehicle into a wheeled vehicle of the ordinary automobile type.

I have entered into a detailed description of the construction and relative arrangement of the parts embraced in the present and preferred embodiment of my invention in order to impart a full, clear and exact understanding of the said embodiment. I do not desire, however, to be understood as confining myself to structural details and details of arrangement, my invention being defined by my appended claims within the scope of which changes in structures and changes in arrangement may be made without departure from my invention.

Having described my invention, what I claim and desire to secure by Letters-Patent, is:—

1. The combination with the chassis of a motor vehicle, of rear runners fixed to the chassis, front runners connected with the chassis and controllable by the steering means of the motor vehicle, a drive shaft carried by the rear runners, a sprocket drum fixed to said drive shaft, a connection between the drive shaft and the shaft of the engine of the motor vehicle, hangers on the forward portion of the chassis, idler sprocket gears connected with said hangers, a traction belt having spaced and parallel chains engaged with the sprocket teeth of the drum and also engaged with the teeth of said idler sprocket gears, and also having transverse traction bars interposed between and connected to the chains, bars arranged between the upper and lower stretches of the chains and having anti-friction means in engagement with the chains, means for yieldingly pressing said bars downwardly, interposed between and connected with the bars and the chassis, a lever disposed in the body, a connection between the said lever and the forward portion of the traction belt for forward movement of said forward portion, and means for raising the forward portion of the traction belt on forward movement thereof.

2. The combination with the chassis of a motor vehicle, of rear runners fixed to the chassis, front runners connected with the chassis and controllable by the steering means of the motor vehicle, a drive shaft carried by the rear runners, a sprocket drum fixed to said drive shaft, a connection between the drive shaft and the shaft of the engine of the motor vehicle, hangers on the forward portion of the chassis, idler sprocket gears connected with said hangers, a traction belt having spaced and parallel chains engaged with the sprocket teeth of the drum and also engaged with the teeth of said idler sprocket gears, and also having transverse traction bars arranged between and connected to the chains, bars interposed between the upper and lower stretches of the chains and having anti-friction means in engagement with the chains, means for yieldingly pressing said bars downwardly, interposed between and connected with the bars and the chassis, a lever disposed in the body, a connection between the said lever and the forward portion of the traction belt for forward movement of said forward portion, and means for raising the forward portion of the traction belt on forward movement thereof the said means for yieldingly pressing the bars downwardly including lazytongs members connected with and extending upwardly from the bars, and crossed retractile springs interposed between and connected to the upper lazytongs members and the chassis.

3. In an organized mechanism for the purpose described and in combination, a motor vehicle chassis, including an engine, runners on said chassis and spaced apart, a drive shaft connected with and extending transversely between said runners, a sprocket drum fixed to said shaft and arranged intermediate of the runners, a traction belt having endless sprocket chains passed about the toothed portion of said drum, a balance wheel on the drive shaft at one side of the sprocket drum, a housing about the drive shaft at the opposite side of the sprocket drum, a worm gear in said housing and fixed to said shaft, a worm meshed with the worm gear and arranged in the housing, a shaft fixed to said worm, and an intermediate shaft connected through an universal joint with the last-named shaft and also connected through an universal joint with the drive shaft of the engine.

4. The combination with the chassis of a motor vehicle, of rear runners attached to the chassis, front runners connected with the chassis and controllable by the steering means of the motor vehicle, a drive shaft carried by the rear runners, a sprocket drum fixed to said drive shaft, a connection between the drive shaft and the shaft of the engine of the motor vehicle, rearwardly and downwardly extending slotted hangers on the forward portion of the chassis, a shaft disposed and movable downwardly and rearwardly and upwardly and forwardly in said slots of the hangers, idler sprocket gears on said shaft, a traction belt having spaced and parallel chains engaged with the sprocket teeth of the drum and also engaged with the teeth of said idler sprocket gears, means for yieldingly pressing the lower stretch of the traction belt downwardly, a pedal lever, and means connecting said pedal lever and the shaft in the slot of the said hangers for upward and forward movement of said shaft on depression of the pedal lever.

In testimony whereof I affix my signature.

PAUL C. LAPORTE.